United States Patent [19]
Nichols

[11] Patent Number: 5,147,560
[45] Date of Patent: Sep. 15, 1992

[54] METHOD FOR MONITORING TURBIDITY OF WASTE LIQUID IN BACKWASHING FILTER BEDS

[75] Inventor: William R. Nichols, Richmond, Va.

[73] Assignee: Infilco Degremont Inc., Richmond, Va.

[21] Appl. No.: 760,583

[22] Filed: Sep. 16, 1991

Related U.S. Application Data

[62] Division of Ser. No. 561,335, Aug. 1, 1990, Pat. No. 5,089,117.

[51] Int. Cl.$^5$ ............................................. B01D 24/46
[52] U.S. Cl. .................................. 210/745; 210/275; 210/793
[58] Field of Search ..................... 210/96.1, 143, 273, 210/275–277, 745, 793, 794, 795

[56] References Cited

U.S. PATENT DOCUMENTS

| | | | |
|---|---|---|---|
| 3,239,061 | 3/1966 | Horning et al. | 210/793 |
| 3,618,766 | 11/1971 | Morey | 210/745 |
| 4,133,766 | 1/1979 | Adie | 210/275 |
| 4,152,265 | 5/1979 | Meyers | 210/273 |
| 4,450,077 | 5/1984 | Black et al. | 210/275 |
| 4,454,034 | 6/1984 | Astrom et al. | 210/275 |
| 4,617,131 | 10/1986 | Walker | 210/277 |
| 4,764,288 | 8/1988 | Walker et al. | 210/276 |
| 4,976,873 | 12/1990 | Ross | 210/795 |

OTHER PUBLICATIONS

Publication—"Turbidity Control as an Aid in Water Filtration and Treatment" by E. Postgate of HF Instruments, Canada, pp. 610–614, from Filtration & Separation, Nov./Dec. 1978.

*Primary Examiner*—Robert A. Dawson
*Assistant Examiner*—Joseph Drodge
*Attorney, Agent, or Firm*—Carroll F. Palmer

[57] ABSTRACT

Improved methods are disclosed for cleansing a plurality of seriate filter beds in automatic backwash filtering systems by backwashing the beds one at a time with backwash liquid from an effluent channel common to seriate effluent ports of the plurality of filter beds and pumping the backwash liquid seriatim through separate effluent ports of individual filter beds and then flowing filtered effluent from each bed through its effluent port into the effluent channel, repeating such steps of backwashing and flowing filtered effluent on individual filter beds until all the filter beds in the system have been backwashed wherein, simultaneously with the backwashing of a second bed, waste liquid from the first bed is pumped through its port while the waste liquid is monitored for turbidity and such waste liquid pumping is continued until the turbidity thereof reaches a predetermined low level. Meanwhile, the cleansing operation on the second bed is prevented from moving to a third bed until the turbidity of the waste liquid from the first bed reaches the predetermined low level. Such monitor control operation is applied to third and further ports until all filter beds in the system have been cleansed.

4 Claims, 2 Drawing Sheets

METHOD FOR MONITORING TURBIDITY OF WASTE LIQUID IN BACKWASHING FILTER BEDS

REFERENCE TO RELATED APPLICATION

This application is a division of copending application Ser. No. 07/561,335, filed Aug. 1, 1990, now U.S. Pat. No. 5,089,117.

BACKGROUND OF THE INVENTION

1. Field of the Invention

This application relates broadly to improvements in automatic backwash filtering systems. More particularly, it concerns apparatus and methods for monitoring the turbidity of effluent for control of backwash operations in such systems.

2. Description of the Prior Art

Automatic backwash filter systems are known in the art as exemplified in U.S. Pat. Nos. 3,239,061; 4,133,766; 4,617,131 and 4,764,288 currently assigned to Infilco Degremont Inc., the assignee of the invention disclosed herein. Such systems are further exemplified in Infilco Degremont's brochure DB-370, dated May, 1989, entitled ABW ® Automatic Backwash Filter. The disclosures of these patents and the brochure are incorporated herein by reference.

A principal use of automatic backwash filter systems is to produce potable water in water treatment plants many of which are subject to state or other governmental regulatory agencies that set standards and conditions concerning the operation of the systems and the quality of the effluent. For example, many such agencies require that, following backwash in filter beds of a potable water treatment plant, the effluent from such filter beds can not be placed back on the service line, but must be sent to waste, until their turbidity reaches a predetermined acceptable low level, e.g., <0.25 NTU. When this turbidity level is reached, the filter beds can be put back in service.

The art of measuring turbidity in fluids is well developed and devices for such purpose take many forms ranging from simple viewing tubes to continuous, on-line electronic-type monitors. Hence, the regulatory turbidity restraints noted above do not present a problem as far as technical measurement of the turbidity in an effluent aliquoit is concerned. However, in order to have efficient operation of an automatic backwash filter system meeting the regulatory turbidity requirements without great increase in equipment costs to attain same, problems are presented in applying known turbidity monitor devices to aliquoits and in utilizing resulting data to assist in the operation of the backwash filter system. The present invention addresses these problems and provides unique apparatus and methods for solving same.

OBJECTS

A principal object of the invention is the provision of improvements in automatic backwash filtering systems.

A further object is the provision of new apparatus and methods for monitoring the turbidity of effluent for control of backwash operations in automatic backwash filtering systems.

Another object is the provision of unique apparatus for obtaining aliquoits for measurement of effluent turbidity from a filter bed in an automatic backwash filtering systems following backwash of the filter bed.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The invention is applied to known methods of cleansing a plurality of seriate filter beds by backwashing the beds one at a time by withdrawing backwash liquid from an effluent channel common to seriate effluent ports of the plurality of filter beds and pumping the backwash liquid seriatim through separate effluent ports of individual filter beds and then flowing filtered effluent from the each bed through its effluent port into the effluent channel and repeating such steps of backwashing and flowing filtered effluent on individual filter beds until all the filter beds in the system have been backwashed. In some embodiments, liquid is purged to waste through the port of each bed subsequent to the backwashing and before backwashing of the next filter bed commences.

The objects are accomplished in part in accordance with the invention by improving such known methods by the addition of a combination of steps which comprise (a) simultaneous with the backwashing of a new bed in the plurality of filter beds, pumping waste liquid from the immediately previous backwashed bed through its effluent port, (b) monitoring such waste liquid for turbidity, (c) continuing the waste liquid pumping until the turbidity thereof reaches a predetermined low level, (d) preventing the cleansing operation on the new bed from moving to a further bed until the turbidity of the waste liquid from the previous backwashed bed reaches a predetermined low level, and (e) reapplying such combination of steps in the repeating of such cleansing operation through all the filter beds in the automatic backwash filter system.

The invention also makes improvements in known filter cleansing systems that have a filter tank divided into a plurality of seriate cells containing filter media, influent means for delivering liquid to be filtered to the top of the filter media, a separate port in each separate cell beneath its filter media for discharging liquid from and charging liquid thereto, an effluent channel common to all the separate ports that all communicate with the effluent channel through a longitudinal planar surface in which the separate ports are substantially equally spaced apart a predetermined distance $\phi$ along a longitudinal axis, backwashing means including a pump for forcing backwashing liquid through the separate ports one at a time to flow upwardly through the cell associated with the respective the port, a backwash shoe that slides along the planar surface to access the separate ports and motor means for sliding the backwash shoe along the planar surface. In some embodiments of filter cleansing systems to which the invention is applied there is purging means to remove liquid from the cells via their respective ports following backwashing.

The objects are also accomplished in part in accordance with the invention by improving such known filter systems by having (1) the sliding surface of the backwash shoe that longitudinally moves along the planar surface in fluid tight contact therewith contain at least first and second openings therein the centers of which are spaced apart about the distance $\phi$, (2) first conduit means connecting the backwashing means pump to the first opening, (3) a waste water pump, (4) second conduit means connecting the waste water pump to the second opening, (5) third conduit means for conveying liquid from the waste water pump to waste and (6) monitor means for monitoring the waste water being conveyed in the third conduit means.

Preferably, the backwash shoe has first, second and third openings therein, the centers of which are spaced apart about the distance $\phi$, the first opening is central and is connected to the aforesaid first conduit means and the second conduit means is connected to the second and third openings via a valve that permits only whichever of the second and third openings is downstream the direction of sliding of the backwash shoe to communicate with the second conduit means.

BRIEF DESCRIPTION OF THE DRAWINGS

A more complete understanding of the invention can be obtained by reference to the accompanying drawings in which.

DESCRIPTION OF THE PREFERRED EMBODIMENTS

Figure 1:
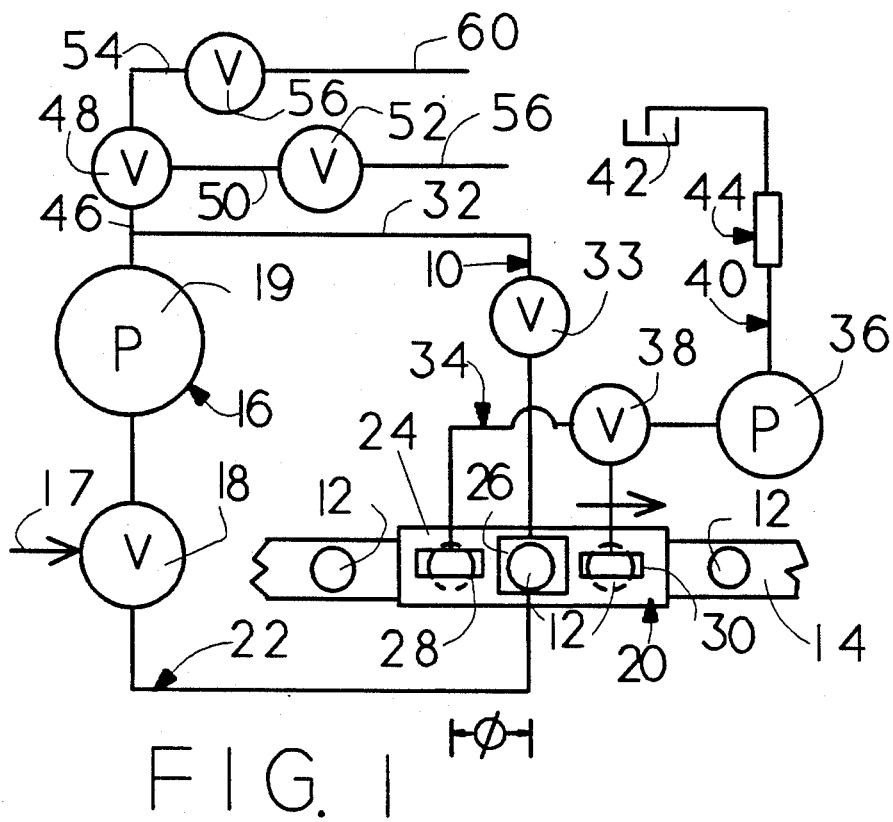
FIG. 1 is a schematic block diagram of a first embodiment of turbidity monitoring apparatus of the invention.

With reference in detail to FIG. 1 of the drawings, the cleansing system 10 which is an improvement over those disclosed in the aforesaid U.S. Pat. No. 4,617,131 that have a filter tank divided into a plurality of seriate cells containing filter media (not shown), influent means for delivering liquid to be filtered to the top of the filter media (not shown), separate ports 12 in each cell beneath its filter media for discharging liquid from and charging liquid to the respective the cell, an effluent channel (not shown) common to the plurality of the separate ports 12 that all communicate with the effluent channel through a longitudinal planar surface 14 in which the separate ports 12 are substantially equally spaced apart a predetermined distance $\phi$ along a longitudinal axis, backwashing means 16 including an effluent conduit 17, a valve 18 and a pump 19 for forcing backwashing liquid through the separate ports 12 one at a time to flow upwardly through the cell associated with the respective the port, a backwash shoe 20 that slides along the planar surface 14 to access the separate ports 12, motor means (not shown) for sliding the backwash shoe 20 along the planar surface 14 and purging means (22) to remove liquid from the cells (not shown) via their respective ports 12 following backwashing.

The backwash shoe 20 has a sliding surface 24 for longitudinal movement along the planar surface 14 in fluid tight contact therewith. In preferred embodiments, the sliding surface 24 has at least first opening 26, second opening 28 and third opening 30 therein the centers of which are spaced apart about the distance $\phi$. Alternatively, in other embodiments, one of the openings 28 or 30 may be omitted, but in such case, the shoe 20 can move in only one direction in performing a combined backwashing and turbidity monitoring operation.

A first conduit means 32 connects the backwash pump 19 via flow control valve 33 to the first opening 26.

A second conduit means 34 connects a waste water pump 36 to the second opening 28 and third opening 30 via a switch valve 38 that permits only whichever of the second and third openings is downstream the direction of sliding of the backwash shoe to communicate with the second conduit means 34. For example, if the movement of the shoe 20 is in the direction of the arrow in FIG. 1, valve 38 would communicate opening 28 with pump 36 and blind opening 30.

A third conduit means 40 conveys liquid from the pump 36 to waste 42 and monitor means 44 monitors the waste water being conveyed in the conduit means 40.

The backwashing means 16 also includes by-pass line 46 and diverter valve 48 that connects via line 50 to adjustable flow valve 52 and via line 54 to adjustable flow valve 56. Egress line 58 from valve 52 discharges into the channel (not shown) from which effluent conduit 17 receives effluent to thereby enable a portion of liquid from pump 19 to commingle with potable water output. Egress line 60 from valve 56 connects to either waste (not shown) or to influent of a filter system for refiltering. The ratio of outputs through lines 58 and 60 is not important to the invention herein described.

In cleansing a plurality of seriate filter beds by backwashing the beds one at a time using the apparatus described above, backwash liquid from an effluent channel (not shown) common to seriate effluent ports 12 of the plurality of filter beds flows through conduit 17 and valve 18 to pump 19 and is pumped seriatim via conduit 32 and valve 33 through the separate effluent ports 12. The backwash sequence for each separate filter bed includes seven controlled phases of backwash, zero flow, purging and filtration, namely, 1) filtration rate, typically about 2 gals./min./sq.ft. filter area (gpm/sq.ft.), decreasing to zero, 2) zero flow, 3) increasing backwash rate, 4) full backwash rate, typically 20 gpm/sq.ft., 5) decreasing backwash rate, 6) zero flow and 7) purging.

In the purging phase, purging liquid is withdrawn from the backwashed filter bed via its port 12, line 22, valve 18 (switched to blind conduit 17), line 46, valve 48, line 54, valve 56 and line 60 to waste. It should be noted, during the backwash phase, backwash liquid moves upwardly through the filter bed while during the purging phase, purging liquid, which mainly consists of influent to the filter bed, moves downward through the filter bed and at a slower flow rate, e.g. 1/10th, than the flow rate of the backwash liquid.

Following such backwash sequence, the backwash shoe 20 will move to the next effluent port 12. Typical travel time for backwash shoe movement from one port to another will be about 20–30 seconds. Subsequent to the backwashing, filtered effluent flows from the each bed through its effluent port into the effluent channel and such steps of backwashing, purging and flowing filtered effluent on individual filter beds is repeated until all the filter beds in the system have been backwashed.

Simultaneous with the backwashing of a new bed in the plurality of filter beds, waste liquid is pumped by pump 36 from the immediately previous backwashed bed through its effluent port 12 and backwash shoe opening 28 (or 30 depending on shoe travel direction) to waste 42. While waste liquid flows to waste in conduit means 40, it is monitored for turbidity by monitor means 44 and this waste liquid pumping and monitoring is continued until the turbidity thereof reaches a predetermined low level. Until that level is reached, typically 0.25 NTU, the backwash shoe 20 is prevented from moving to a further bed. When the shoe 20 does move on, the combination of steps in the cleansing operation is repeated through all the filter beds in the automatic backwash filter system 10.

Figure 2:
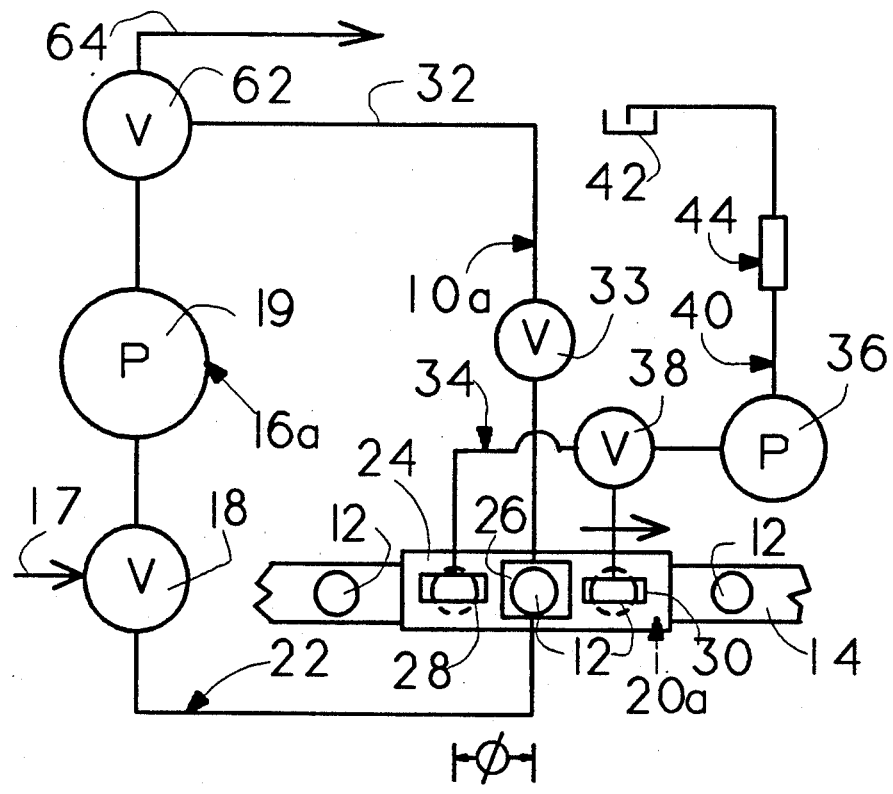
FIG. 2 is a schematic block diagram of a second embodiment of turbidity monitoring apparatus of the invention.

With reference to FIG. 2, in the cleansing system 10a, which is an improvement over those disclosed in the aforesaid U.S. Pat. No. 4,764,288, the openings 28 and 30, conduit 34, pump 36 and other components associated with monitor means 44 are essentially as in cleansing system 10, but the backwash means 16a is different from backwash means 16 of system 10. Thus, the means 16a includes a diverter valve 62 and an egress line 64 for eventual passage of liquid to a filter member for refiltering or to a waste tank or like disposal means not important to the invention herein disclosed. Hence, the method of monitoring the turbidity of the previously backwashed filter bed in system 10a is like the monitoring method in system 10, but there is a variation in the way waste is handled during backwashing and purging with system 10a as compared with system 10. Such variation is not important to the invention herein disclosed, but serves to show that the new monitoring apparatus and methods of the invention are applicable to the various automatic backwash filter systems that comprise a backwash shoe that transits a multiplicity of effluent ports in the filter system.

Figure 3:
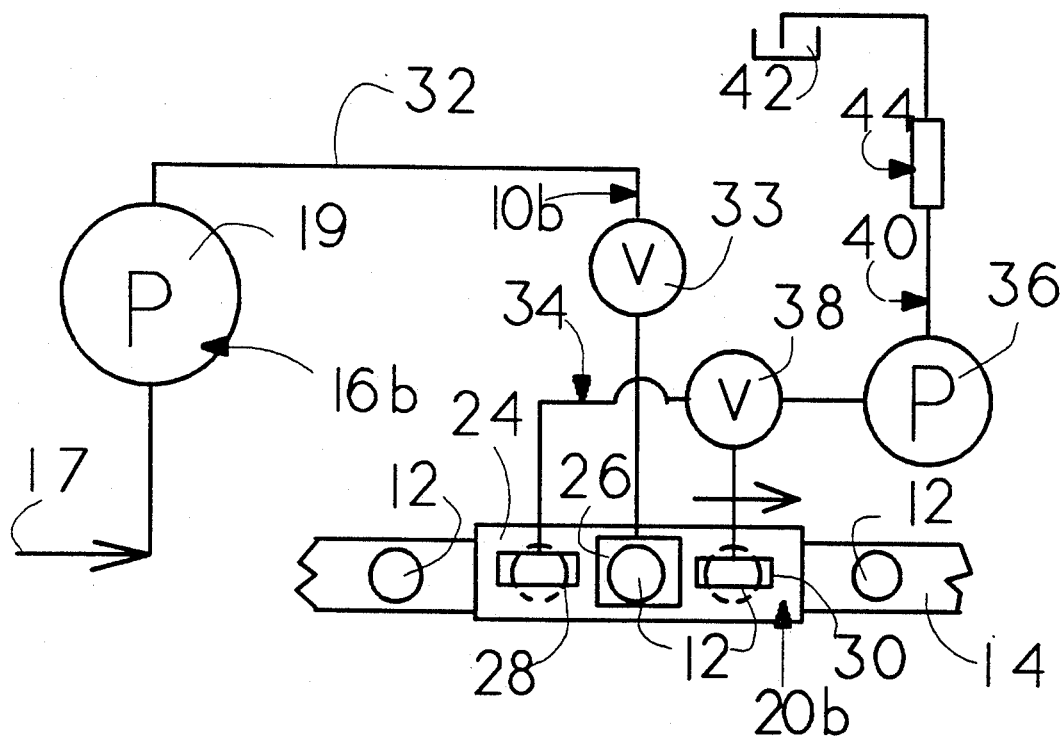
FIG. 3 is a schematic block diagram of a third embodiment of turbidity monitoring apparatus of the invention.

With reference to FIG. 3, the cleansing system 10b, which is an improvement over those disclosed in the aforesaid U.S. Pat. No. 4,133,766, differs from those shown in FIGS. 1 and 2 in not having any provision for purging filter beds following backwashing. Thus, system 10b, in comparison with system 10a, eliminates the lines 22 and 64 as well as valves 18 and 62 of system 10a. The operation of system 10b is similar to that of system 10a except that the step of purging filter beds after backwashing is omitted, but monitoring of turbidity of the previously backwashed filter bed (not shown) is applied to prevent the backwash shoe 20b from advancing to the next filter bed (not shown) until the monitor means 44 signals that the predetermined low level of turbidity exists in the liquid issuing from pump 36.

The embodiments of the invention in which an exclusive property or privilege is claimed are defined as follows:

1. In a method of cleansing a plurality of seriate filter beds in an automatic backwash filter system by subjecting said filter beds seriatim to a backwashing step, wherein during said backwashing step backwash liquid is withdrawn from an effluent channel common to seriate effluent ports of said filter beds and pumped through a first port which is the effluent port of a first filter bed of said plurality of filter beds to flow upwardly through said first filter bed, repeating said backwashing step on a second filter bed through a second port which is the effluent port of said second bed and further repeating said backwashing step on third and further beds through their respective effluent ports, the improvement which comprises:

simultaneous with said backwashing step of said second bed applying a purging step to said first filter bed by pumping waste liquid downwardly through said first bed and out said first port, monitoring said waste liquid from said first bed for turbidity, continuing said waste liquid pumping from said first bed until the turbidity thereof reaches a predetermined low level, discontinuing said backwashing step on said second bed only after said turbidity of said waste liquid from said first bed reaches said predetermined low level, after discontinuing said backwashing step on said second bed applying said backwashing step to a third filter bed and simultaneously applying said purging step with said monitoring to said second filter bed, discontinuing said backwashing step on said third bed and applying said purging step with monitoring thereto only after said turbidity of said waste liquid from said second bed reaches said predetermined low level, and repeating in like manner said backwashing step and said purging step with monitoring to further filter beds in said automatic backwash filter system.

2. The method of claim 1 wherein said effluent ports are all of substantially equal size and equally spaced apart along a longitudinal axis.

3. The method of claim 1 wherein the rate of flow of said backwash liquid during said backwashing step in each said filter bed through said effluent port thereof is about 10 times the rate of flow of said waste liquid through its said effluent port during said purging step thereof.

4. In a method of cleansing a plurality of seriate filter beds in an automatic backwash filter system by subjecting said filter beds seriatim to a backwashing step, wherein during said backwashing step backwash liquid is withdrawn from an effluent channel common to seriate effluent ports of said filter beds and pumped through a first port which is the effluent port of a first filter bed of said plurality of filter beds to flow upwardly through said first filter bed, repeating said backwashing step on a second filter bed through a second port which is the effluent port of said second bed and further repeating said backwashing step on third and further beds through their respective effluent ports, the improvement which comprises:

simultaneous with said backwashing step of said second bed applying a purging step to said first filter bed by pumping waste liquid downwardly through said first bed and out said first port to discharge to waste, monitoring said waste liquid from said first bed for turbidity prior to discharge to waste, continuing said waste liquid pumping from said first bed until the turbidity thereof reaches a predetermined low level, discontinuing said backwashing step on said second bed only after said turbidity of said waste liquid from said first bed reaches said predetermined low level, after discontinuing said backwashing step on said second bed applying said backwashing step to a third filter bed and simultaneously applying said purging step with said monitoring to said second filter bed, discontinuing said backwashing step on said third bed and applying said purging step with monitoring thereto only after said turbidity of said waste liquid from said second bed reaches said predetermined low level, and repeating in like manner said backwashing step and said purging step with monitoring to further filter beds in said automatic backwash filter system.

* * * * *